(12) United States Patent
Li

(10) Patent No.: US 9,523,847 B2
(45) Date of Patent: Dec. 20, 2016

(54) PERISCOPE LENS AND TERMINAL DEVICE

(71) Applicant: Huawei Device Co., Ltd., Shenzhen (CN)

(72) Inventor: Zhenggang Li, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/908,982

(22) PCT Filed: Sep. 16, 2014

(86) PCT No.: PCT/CN2014/086634
§ 371 (c)(1),
(2) Date: Jan. 29, 2016

(87) PCT Pub. No.: WO2015/035960
PCT Pub. Date: Mar. 19, 2015

(65) Prior Publication Data
US 2016/0161733 A1    Jun. 9, 2016

(30) Foreign Application Priority Data

Sep. 16, 2013  (CN) .......................... 2013 1 0422946

(51) Int. Cl.
*G02B 23/08*   (2006.01)
*G03B 5/00*    (2006.01)
*G02B 13/00*   (2006.01)
*G03B 11/00*   (2006.01)
*H04N 5/225*   (2006.01)

(52) U.S. Cl.
CPC ............. *G02B 23/08* (2013.01); *G02B 13/009* (2013.01); *G02B 13/0065* (2013.01); *G03B 5/00* (2013.01); *G03B 11/00* (2013.01); *H04N 5/2254* (2013.01)

(58) Field of Classification Search
CPC ....... G02B 23/08; G02B 13/009; G02B 11/00; H04N 5/2251–5/2259
See application file for complete search history.

(56) References Cited

U.S. PATENT DOCUMENTS 5,936,773 A * 8/1999 Togino ................. H04N 5/2254
                                               348/E5.025
7,625,139 B2 * 12/2009 Seita .................... H04N 5/2254
                                               359/817

(Continued)

FOREIGN PATENT DOCUMENTS

CN    2672676 Y    1/2005
CN    1682525 A    10/2005

(Continued)

*Primary Examiner* — Jason Flohre
(74) *Attorney, Agent, or Firm* — Leydig, Voit & Mayer, Ltd.

(57) ABSTRACT

Embodiments of the present invention disclose a terminal device. The terminal device includes a periscope lens. The periscope lens includes a filter, a reflective prism module, a zoom lens, and a sensor, where the filter is configured to filter a light ray transmitted from the outside, and the reflective prism module is configured to reflect twice the light ray into the sensor in combination with the zoom lens, where the light ray is obtained after the filtering by the filter. According to the terminal device in the present invention, a limitation on a thickness of the periscope lens imposed by a width of the sensor can be reduced.

10 Claims, 4 Drawing Sheets

A-A

(56) References Cited

U.S. PATENT DOCUMENTS

| | | | |
|---|---|---|---|
| 2003/0160902 A1 | 8/2003 | Mihara et al. | |
| 2003/0206352 A1* | 11/2003 | Mihara | G02B 15/177 359/684 |
| 2005/0253951 A1 | 11/2005 | Fujimoto et al. | |
| 2006/0109567 A1 | 5/2006 | Chen | |
| 2007/0024739 A1* | 2/2007 | Konno | H04N 5/2254 348/337 |
| 2009/0153726 A1 | 6/2009 | Lim | |
| 2011/0051243 A1 | 3/2011 | Su | |
| 2012/0019715 A1 | 1/2012 | Shen et al. | |
| 2012/0069042 A1 | 3/2012 | Ogita et al. | |
| 2012/0075523 A1* | 3/2012 | Okuda | H04N 5/2252 348/374 |
| 2012/0075726 A1 | 3/2012 | Takakubo et al. | |
| 2012/0249815 A1* | 10/2012 | Bohn | H04N 5/2254 348/208.99 |
| 2013/0278785 A1* | 10/2013 | Nomura | H04N 5/23287 348/208.11 |
| 2014/0132488 A1* | 5/2014 | Kim | H01L 51/52 345/76 |
| 2014/0218799 A1* | 8/2014 | Suzuka | G02B 13/0065 359/557 |
| 2015/0293329 A1 | 10/2015 | Gong | |
| 2015/0338617 A1 | 11/2015 | Nie et al. | |

FOREIGN PATENT DOCUMENTS

| | | |
|---|---|---|
| CN | 201096952 Y | 8/2008 |
| CN | 101458388 A | 6/2009 |
| CN | 102411878 A | 4/2012 |
| CN | 103513412 A | 1/2014 |
| CN | 103901587 A | 7/2014 |
| CN | 103955049 A | 7/2014 |
| EP | 1962496 A2 | 8/2008 |
| KR | 100912198 B1 | 8/2009 |
| TW | 201205524 A1 | 2/2012 |

* cited by examiner

PERISCOPE LENS AND TERMINAL DEVICE

CROSS-REFERENCE TO RELATED APPLICATIONS

This application is a U.S. National Stage of International Patent Application No. PCT/CN2014/086634, filed on Sep. 16, 2014, which claims priority to Chinese Patent Application No. 201310422946.2, filed on Sep. 16, 2013, both of which are hereby incorporated by reference in their entireties.

TECHNICAL FIELD

The present invention relates to an electronic device, and in particular, to a periscope lens and a terminal device.

BACKGROUND

Currently, there is an increasing tendency for wide application of a camera function to a mobile phone. A built-in periscope lens that has an optical zoom function is widely applied to a mobile phone. A user poses higher requirements for performance of a mobile phone and a digital camera, for example, a higher optical zoom multiple or higher imaging quality such as image quality; however, a photosensitive element (that is, a sensor) that can meet such high performance is accordingly larger in outline dimensions.

FIG. 1 shows a principle diagram of an existing periscope lens. As shown in FIG. 1, in the existing periscope lens, after passing through a filter module 110, an external light ray is reflected by a reflective prism module 120, optically zoomed by a zoom lens module 130 in the middle, and forms an image on a sensor 140 that is placed at a bottom of the lens. It may be seen that a thickness T1 of the existing periscope lens is limited by a width T2 of the sensor.

Therefore, in the prior art, a width of a sensor of the periscope lens needs to be increased to improve imaging quality, so that a thickness of the periscope lens increases accordingly, and a thickness of a terminal device such as a mobile phone or a digital camera on which the periscope lens is installed also increases accordingly.

SUMMARY

In view of this, a technical problem that needs to be resolved in the present invention is how to reduce a limitation on a thickness of a periscope lens imposed by a width of a sensor. A periscope lens and a terminal device are provided, which have a relatively small thickness but relatively high imaging quality can be ensured.

To resolve the foregoing technical problem, according to a first aspect, the present invention provides a periscope lens, including a filter, a reflective prism module, a zoom lens, and a sensor; where the filter is configured to filter a light ray transmitted from the outside; and the reflective prism module is configured to reflect twice a light ray into the sensor in combination with the zoom lens, where the light ray is obtained after the filtering by the filter.

With reference to the first aspect, in a first possible implementation manner, the reflective prism module includes at least a first reflective prism and a second reflective prism; where the first reflective prism is configured to reflect, into the zoom lens, the light ray emitted from the filter; and the second reflective prism is configured to reflect, into the sensor, the light ray emitted from the zoom lens.

With reference to the first possible implementation manner of the first aspect, in a second possible implementation manner, the filter is placed at a first angle to the first reflective prism, and a range of the first angle is from 30 degrees to 60 degrees.

With reference to the second possible implementation manner of the first aspect, in a third possible implementation manner, the first angle is 45 degrees.

With reference to the first possible implementation manner of the first aspect, in a fourth possible implementation manner, the first reflective prism is placed at a second angle to the second reflective prism, and a range of the second angle is from 0 degrees to 45 degrees.

With reference to the fourth possible implementation manner of the first aspect, in a fifth possible implementation manner, the second angle is 0 degrees.

With reference to the first possible implementation manner of the first aspect, in a sixth possible implementation manner, the second reflective prism is placed at a third angle to the sensor, and a range of the third angle is from 30 degrees to 60 degrees.

With reference to the sixth possible implementation manner of the first aspect, in a seventh possible implementation manner, the third angle is 45 degrees.

To resolve the foregoing technical problem, according to a second aspect, the present invention provides a terminal device, including any one of the foregoing periscope lenses.

With reference to the second aspect, in a first possible implementation manner, a sensor of the periscope lens and a screen display of the terminal device are disposed in parallel in a length direction of the terminal device.

With reference to the first possible implementation manner of the second aspect, in a second possible implementation manner, the screen display of the terminal device has a cavity on the back, a reflective prism module and a zoom lens that are of the periscope lens form an extended area of the periscope lens between a filter and the sensor, at least a part of the extended area is located in the cavity, and at least a part of a vertical projection of the filter on the screen display of the terminal device is located on the screen display.

With reference to the second aspect and the foregoing possible implementation manners of the second aspect, in a third possible implementation manner, a light entrance side of the filter of the periscope lens and the screen display of the terminal device are disposed in parallel.

With reference to the second aspect and the foregoing possible implementation manners of the second aspect, in a fourth possible implementation manner, a light sensitive side of the sensor of the periscope lens and the screen display of the terminal device are disposed in parallel.

According to the periscope lens and the terminal device in embodiments, a light ray obtained after filtering by a filter of the periscope lens is reflected twice into a sensor by a reflective prism module in combination with a zoom lens so that a limitation on a thickness of the periscope lens imposed by a width of the sensor can be reduced. It can be ensured that the periscope lens is relatively thin when a dimension T2 of a periphery of a sensor increases resulting from using the sensor of a greater dimension or adding an OIS (Optical Image Stabilization, optical image stabilization) optical image stabilization technology with the purpose of improving imaging quality, and imaging quality of a periscope lens of a same thickness and dimension can also be improved. Therefore, a terminal device on which the periscope lens is installed has a relatively small thickness but relatively high imaging quality can be ensured.

Exemplary embodiments are described in detail with reference to accompanying drawings to make other features and aspects of the present invention clear.

BRIEF DESCRIPTION OF DRAWINGS

Accompanying drawings that is included in the specification and that constitutes a part of the specification, and the specification illustrate exemplary embodiments, features, and aspects of the present invention, and are used for explaining principles of the present invention.

DESCRIPTION OF EMBODIMENTS

Figure 1:
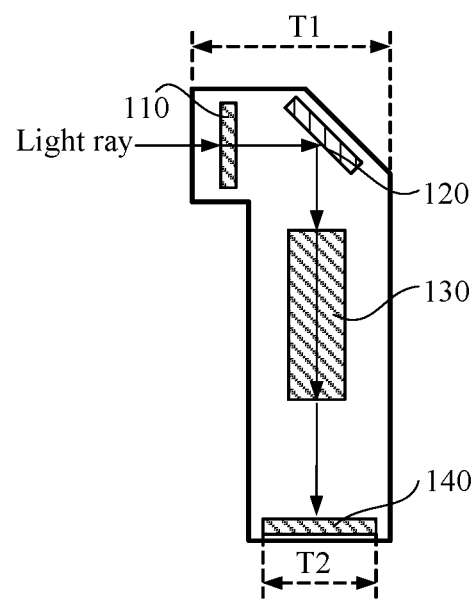
FIG. 1 shows a structural diagram of an existing periscope lens.

Various exemplary embodiments, features, and aspects of the present invention are described in detail in the following with reference to accompanying drawings. In the drawings, identical reference numerals denote elements that have an identical or similar function. Although various aspects of the embodiments are shown in the drawings, unless otherwise specified, the drawings are not necessarily drawn to scale.

The specific term "exemplary" herein means "used as an example, embodiment or illustrative". Any embodiment described for "exemplary" purpose is not necessarily explained as being superior or better than other embodiments.

In addition, to better describe the present invention, many details are described in the following specific implementation manners. A person skilled in the art shall understand that the present invention can still be implemented even without such details. In other instances, well-known methods, means, elements, and circuits are not described in detail, so as to highlight the theme of the present invention.

Embodiment 1

Figure 2:
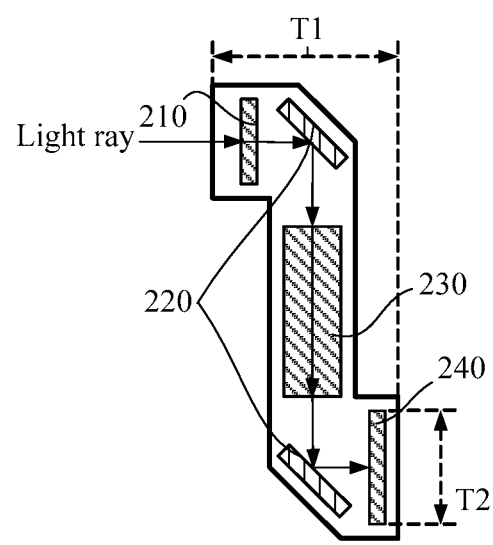
FIG. 2 shows a structural diagram of a periscope lens according to an embodiment of the present invention.

FIG. 2 shows a structural diagram of a periscope lens according to an embodiment of the present invention. As shown in FIG. 2, the periscope lens may include a filter 210, a reflective prism module 220, a zoom lens 230, and a sensor (sensor) 240.

The filter 210 is configured to filter a light ray transmitted from the outside.

The reflective prism module 220 is configured to reflect twice a light ray into the sensor 240 in combination with the zoom lens 230, where the light ray is obtained after the filtering by the filter 210.

Specifically, after being filtered by the filter 210 of the periscope lens, the light ray is transmitted into the reflective prism module 220, reflected twice by the reflective prism module 220, optically zoomed by the zoom lens 230, and finally transmitted into the sensor 240.

The sensor 240 may be a photosensitive element, and may perform optical-to-electrical conversion on the transmitted light ray and output an electrical signal to a terminal device for processing such as imaging.

As shown in FIG. 2, the light ray obtained after the filtering by the filter of the periscope lens is reflected twice into the sensor by the reflective prism module in combination with the zoom lens, so that a location of the sensor changes accordingly and does not need to be vertical. Therefore, a thickness T1 of the periscope lens is not limited by a width T2 of the sensor. As a result, on one hand, it can be ensured that the thickness T1 of the periscope lens remains unchanged when the width T2 of the sensor of the periscope lens increases to improve imaging quality; on the other hand, the thickness T1 of the periscope lens can be reduced when the width T2 of the sensor remains unchanged.

According to the periscope lens in this embodiment, a light ray obtained after filtering by a filter of the periscope lens is reflected twice into a sensor by a reflective prism module in combination with a zoom lens, so that a limitation on a thickness of the periscope lens imposed by a width of the sensor can be reduced. It can be ensured that the periscope lens is relatively thin when a dimension T2 of a periphery of a sensor increases resulting from using the sensor of a greater dimension and using an OIS optical image stabilization technology with the purpose of improving imaging quality, and imaging quality of a periscope lens of a same thickness and dimension can also be improved.

Embodiment 2

Figure 3:
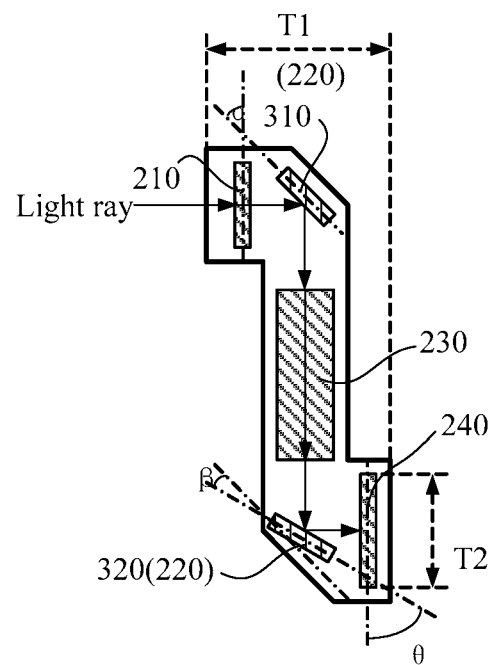
FIG. 3 shows a structural diagram of a periscope lens according to another embodiment of the present invention.

FIG. 3 shows a structural diagram of a periscope lens according to another embodiment of the present invention. Components with a same reference sign in FIG. 2 and FIG. 3 have a same function. Compared with the periscope lens shown in FIG. 2, the periscope lens shown in FIG. 3 mainly differs in that the reflective prism module 220 may further include at least a first reflective prism 310 and a second reflective prism 320, where the first reflective prism 310 is configured to reflect, into the zoom lens 230, the light ray emitted from the filter 210, and the second reflective prism 320 is configured to reflect, into the sensor 240, the light ray emitted from the zoom lens 230.

For the foregoing periscope lens, in a possible implementation manner, the filter 210 is placed at a first angle $\alpha$ to the first reflective prism 310, and a range of the first angle $\alpha$ may be from 30 degrees to 60 degrees. Preferably, the first angle $\alpha$ may be 45 degrees.

For the foregoing periscope lens, in a possible implementation manner, the first reflective prism 310 is placed at a second angle $\beta$ to the second reflective prism 320, and a range of the second angle $\beta$ may be from 0 degrees to 45 degrees. Preferably, the second angle $\beta$ may be 0 degrees, that is, the first reflective prism 310 and the second reflective prism 320 may be placed in parallel.

For the foregoing periscope lens, in a possible implementation manner, the second reflective prism 320 is placed at a third angle $\theta$ to the sensor 240, and a range of the third angle $\theta$ may be from 30 degrees to 60 degrees. Preferably, the third angle $\theta$ may be 45 degrees.

Specifically, in an example, the first angle $\alpha$ is 45 degrees, the second angle $\beta$ is 0 degrees, and the third angle $\theta$ is 45 degrees. After passing through the filter 210, the light ray is reflected by the first reflective prism 310 at an angle of 45 degrees for the first time, optically zoomed by the zoom lens 230 in the middle, then reflected by the second reflective prism 320 at an angle of 45 degrees for the second time, and forms an image on the sensor (sensor) 240, where an angle of 90 degrees is formed between the sensor 240 and the zoom lens 230, or the sensor 240 is parallel to the filter 210. In a case in which the sensor (sensor) 240 is parallel to the filter 210, a width of the sensor hardly imposes direct impact on a thickness of the periscope lens.

According to the periscope lens in this embodiment, a light ray obtained after filtering by a filter of the periscope lens is reflected twice into a sensor by a reflective prism module in combination with a zoom lens, so that a limitation on a thickness of the periscope lens imposed by a width of the sensor can be reduced. It can be ensured that the periscope lens is relatively thin when a dimension T2 of a periphery of a sensor increases resulting from using the sensor of a greater dimension and using an OIS optical image stabilization technology with the purpose of improving imaging quality, and imaging quality of a periscope lens of a same thickness and dimension can also be improved.

Embodiment 3

Figure 4A:
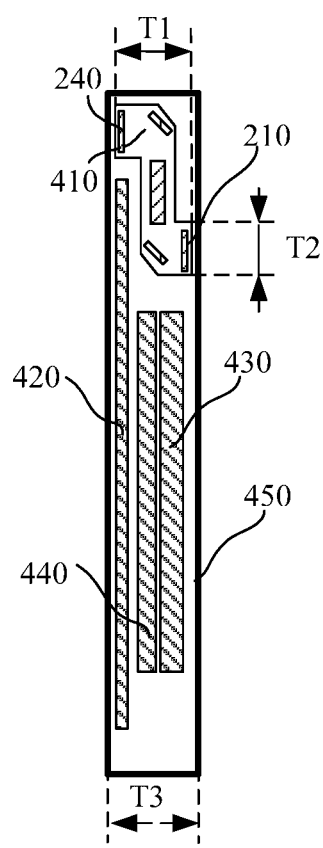
FIG. 4a shows a schematic sectional view of a composition structure of a terminal device according to still another embodiment of the present invention.
Figure 4B:
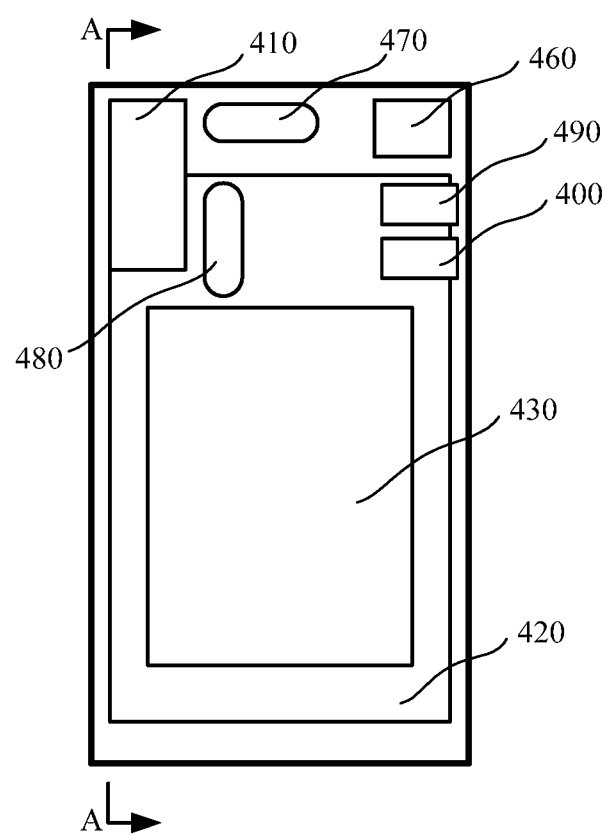
FIG. 4b shows a schematic rearview of a composition structure of a terminal device according to still another embodiment of the present invention.

FIG. 4a shows a schematic sectional view of a composition structure of a terminal device according to still another embodiment of the present invention. FIG. 4b shows a schematic rearview of a composition structure of a terminal device according to still another embodiment of the present invention. As shown in FIG. 4a and FIG. 4b, the terminal device may include a periscope lens 410 in any one of the foregoing structures.

As shown in FIG. 4a and FIG. 4b, the terminal device in this embodiment may further include a screen display 420, a battery 430, a PCBA (Printed Circuit Board Assembly, printed circuit board assembly) 440, a housing 450, a front-facing camera (Camera) 460, a receiver (Receiver) 470, a xenon lamp 480, a SIM (Subscriber Identity Module, subscriber identity module) card 490, and a T card (T-flash card, a removable flash card) 400. A type of the screen display 420 is not limited, and the screen display 420 may be an LCD (Liquid Crystal Display, liquid crystal display), or may be a screen display of another type. A control manner of the screen display 420 may be TP (Touch Panel, touch panel) control, or may be keyboard control.

For the foregoing terminal device, in a possible implementation manner, a sensor 240 of the periscope lens 410 and the screen display 420 of the terminal device may be disposed in parallel in a length direction of the terminal device. In this way, existing thickness and space above the screen display of the terminal device can be effectively utilized, which can not only make the terminal device thinner in thickness, but also make the terminal device shorter in length.

For the foregoing terminal device, in a possible implementation manner, the screen display 420 of the terminal device has a cavity on the back, a reflective prism module 220 and a zoom lens 230 that are of the periscope lens 410 form an extended area of the periscope lens 410 between a filter 210 and the sensor 240, at least a part of the extended area is located in the cavity, and at least a part of a vertical projection of the filter 210 on the screen display 420 of the terminal device is located on the screen display 420. In this way, thickness and space of the terminal device on the back of the screen display can be effectively utilized, which can not only make the terminal device thinner in thickness, but also make the terminal device shorter in length.

For the foregoing terminal device, in a possible implementation manner, a light entrance side of the filter 210 of the periscope lens 410 and the screen display 420 of the terminal device may be disposed in parallel. In this way, thickness and space of the terminal device can be effectively utilized, so that the periscope lens 410 does not protrude from a surface of the housing 450 of the terminal device, which can not only make the terminal device thinner in thickness, but also make the periscope lens safer and an appearance of the terminal device more elegant.

For the foregoing terminal device, in a possible implementation manner, a light sensitive side of the sensor 240 of the periscope lens 410 and the screen display 420 of the terminal device may further be disposed in parallel. In this way, thickness and space of the terminal device can be utilized to a greatest extent, so that the periscope lens 410 does not protrude from a surface of the terminal device, which can not only ensure that the terminal device is thinner in thickness, but also make the periscope lens safer and an appearance of the terminal device more elegant.

A periscope lens in any one of the foregoing structures may be disposed on the terminal device in this embodiment. A light ray obtained after filtering by a filter of the periscope lens is reflected twice into a sensor by a reflective prism module in combination with a zoom lens, so that a limitation on a thickness of the periscope lens imposed by a width of the sensor can be reduced. It can be ensured that the periscope lens is relatively thin when a dimension T2 of a periphery of a sensor increases resulting from using the sensor of a greater dimension and using an OIS optical image stabilization technology with the purpose of improving imaging quality, and imaging quality of a periscope lens of a same thickness and dimension can also be improved. Therefore, a terminal device on which the periscope lens is installed has a relatively small thickness but relatively high imaging quality can be ensured.

The foregoing descriptions are merely specific embodiments of the present invention and are merely used to describe the technical solutions of the present invention, but the protection scope of the present invention is not limited hereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal device, comprising:
a screen display having a front and a back; and
a periscope lens, the periscope lens comprising a filter, a reflective prism module, a zoom lens, and a sensor, the reflective prism module having at least a first reflective prism and a second reflective prism; wherein
the filter is configured to filter a light ray transmitted from the outside; and
the reflective prism module is configured to reflect twice the light ray into the sensor in combination with the zoom lens, wherein the light ray is obtained after the filtering by the filter;
wherein the sensor and the screen display are disposed in parallel in a length direction of the terminal device, and wherein the sensor is disposed above the screen display along the length direction; and
wherein:
the screen display has a cavity on the back, the reflective prism module and the zoom lens that are of the periscope lens form an extended area of the periscope lens between the filter and the sensor, at least a part of the extended area is located in the cavity, and at least a part of a vertical projection of the filter on the screen display is located on the screen display.

2. The terminal device according to claim 1, wherein the first reflective prism is configured to reflect, into the zoom lens, a light ray emitted from the filter; and the second reflective prism is configured to reflect, into the sensor, a light ray emitted from the zoom lens.

3. The terminal device according to claim 2, wherein the filter is placed at a first angle to the first reflective prism, and a range of the first angle is from 30 degrees to 60 degrees.

4. The terminal device according to claim 3, wherein the first angle is 45 degrees.

5. The terminal device according to claim 2, wherein the first reflective prism is placed at a second angle to the second reflective prism, and a range of the second angle is from 0 degrees to 45 degrees.

6. The terminal device according to claim 5, wherein the second angle is 0 degrees.

7. The terminal device according to claim 2, wherein the second reflective prism is placed at a third angle to the sensor, and a range of the third angle is from 30 degrees to 60 degrees.

8. The terminal device according to claim 7, wherein the third angle is 45 degrees.

9. The terminal device according to claim 1, wherein a light entrance side of the filter and the screen display are disposed in parallel.

10. The terminal device according to claim 1, wherein a light sensitive side of the sensor and the screen display are disposed in parallel.

* * * * *